Apr. 3, 1923.
J. G. RIEFF.
DETACHABLE CHAIN HOOK.
FILED JUNE 26, 1922.
1,450,389.
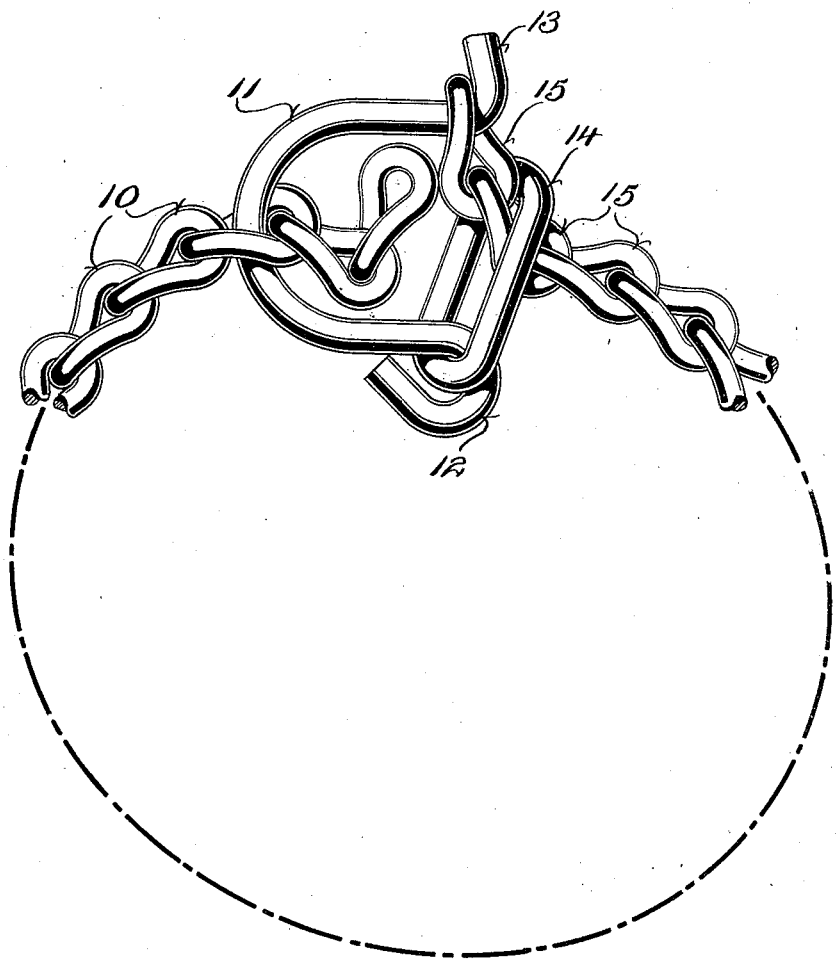
Inventor
John G. Rieff Patented Apr. 3, 1923.

1,450,389

UNITED STATES PATENT OFFICE.

JOHN G. RIEFF, OF LONDON, WISCONSIN.

DETACHABLE CHAIN HOOK.

Application filed June 26, 1922. Serial No. 571,096.

*To all whom it may concern:*

Be it known that I, JOHN G. RIEFF, a citizen of the United States, and resident of London, in the county of Dane and State of Wisconsin, have invented certain new and useful Improvements in Detachable Chain Hooks; and I do hereby declare that the following is a full, clear, and exact description thereof.

The invention relates to a detachable chain hook for connecting together the ends of a chain, the device being used especially on anti-skid chains.

A primary object of the invention is the provision of a hook which may be readily attached or detached from the chain links, and which, when in position, is securely locked against accidental removal.

More specifically, the object of the invention is the provision of a hook, for the purpose described, with a locking loop in such manner that the chain may be inserted or removed only by drawing the ends of the links to be connected thru the loop and extending one of them over an outwardly directed finger on the hook.

With the above and other objects in view which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing, is illustrated one complete example of the physical embodiment of the present invention constructed according to the best mode so far devised for the practical application of the principles thereof, in which:

The figure is a plan, bringing out the relation between the hook and the ends of a chain, the hook being shown in locked position.

The device is useful especially in connection with a solid rubber tire, but may be applied to a pneumatic tire and, in fact, may be used for any purpose where the ends of a chain are united. The chain is passed around the tire and rim, or the other objects, and thru one of the links 10 the hook is passed. The hook is made of comparatively heavy material and consists of a U shaped portion 11, one of the arms of which is curved laterally to form an eye 12, the other arm being deflected to form a hook 13. An elongated closed loop 14 is received in eye 12 so that the loop and hook have three relative pivotal movements. In securing the chain in position, the links 15 of one end are extended thru the loop 14, and one of them is threaded over finger 13. This is preferably the end link of the chain, but any link may be used, depending on the size of the object enveloped by the chain. The adjustment of the chain may be varied also by extending the hook thru a loop 10, more or less remotely positioned with respect to the nearer end of the chain.

Tension on the chain has no tendency to release it from the hook, as such force acts to draw the end link 15 downwardly thru the loop 14. To release the chain, the end link 15 need merely be drawn over the finger 13 and slipped thru loop 14. This does not necessitate having much slack in the chain, so that the device is adapted to effect convenient release and at the same time maintain the chain snugly in position, enveloping the object. There can be no release of the chain otherwise than by the removal of an end link 15 from finger 13. As this necessitates a considerable movement of the end loop, it precludes all possibility of accidental release.

I claim:

1. The combination of a chain, a hook extending thru one of the links adjacent thereof, a closed loop pivotally secured to said hook, the other end of said chain extending thru said loop, and a finger on said hook extending thru a link on said latter end of the chain.

2. The combination of a chain, a hook extending thru a link adjacent one end thereof, an elongated loop pivotally secured to one end of said hook, the other end of said chain extending thru said loop, and a laterally directed finger on said hook extending thru a link on the latter end of said chain.

In testimony that I claim the foregoing I have hereunto set my hand at London, in the county of Dane, and State of Wisconsin.

JOHN G. RIEFF.